US012748880B2

(12) United States Patent
Tashiro et al.

(10) Patent No.: US 12,748,880 B2
(45) Date of Patent: Sep. 29, 2026

(54) MANAGING SEARCH QUERIES USING ENCRYPTED CACHE DATA

(71) Applicant: International Business Machines Corporation, Armonk, NY (US)

(72) Inventors: Takahito Tashiro, Tokyo (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 17/205,648

(22) Filed: Mar. 18, 2021

(65) Prior Publication Data

US 2022/0300635 A1 Sep. 22, 2022

(51) Int. Cl.

| | |
|---|---|
| ***G06F 21/62*** | (2013.01) |
| ***G06F 16/2455*** | (2019.01) |
| ***G06F 21/60*** | (2013.01) |
| ***H04L 9/40*** | (2022.01) |

(52) U.S. Cl.
CPC .... *G06F 21/6227* (2013.01); *G06F 16/24552* (2019.01); *G06F 21/602* (2013.01); *H04L 63/101* (2013.01)

(58) Field of Classification Search
CPC ............... G06F 21/6227; G06F 21/602; G06F 16/24552; H04L 63/101
See application file for complete search history.

(56) References Cited

U.S. PATENT DOCUMENTS

| | | | | |
|---|---|---|---|---|
| 9,002,811 | B2 | 4/2015 | Kan et al. | |
| 9,165,079 | B1 | 10/2015 | Kulick et al. | |
| 2005/0289127 | A1 | 12/2005 | Giampaolo et al. | |
| 2007/0016583 | A1 * | 1/2007 | Lempel ............... | G06F 21/6227 707/999.009 |

(Continued)

FOREIGN PATENT DOCUMENTS

| | | | |
|---|---|---|---|
| CA | 3058061 | A1 | 4/2020 |
| CN | 102110104 | B | 12/2016 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Jorge L Ortiz Criado
(74) *Attorney, Agent, or Firm* — Eric W. Chesley

(57) ABSTRACT

A processor may receive a search query and encrypted cache data from a search client. The processor may search an index for a listing of target data that matches the search query. The processor may decrypt the cache data and collate the cache data with the listing of target data to ascertain a first accessibility determination to a first data. The processor may query a data source server to ascertain a second accessibility determination to a second data. In response to the query, the processor may receive the second accessibility determination. The processor may prepare a result list by removing a (Continued)

third data from the target data in response to at least one of the first accessibility determination and the second accessibility determination indicating that the third data is inaccessible by the search client.

12 Claims, 6 Drawing Sheets

(56) References Cited

U.S. PATENT DOCUMENTS

| | | | | |
|---|---|---|---|---|
| 2010/0082555 | A1* | 4/2010 | Ogawa | G06F 16/1734 707/688 |
| 2016/0112397 | A1* | 4/2016 | Mankovskii | H04L 63/105 726/6 |
| 2017/0250816 | A1* | 8/2017 | Popa | G06F 21/62 |
| 2018/0246969 | A1 | 8/2018 | Hind | |
| 2020/0311309 | A1* | 10/2020 | Dawer | H04L 9/0825 |
| 2020/0334317 | A1 | 10/2020 | Ashman | |

FOREIGN PATENT DOCUMENTS

| | | | | | |
|---|---|---|---|---|---|
| CN | 107809436 | B | | 3/2018 | |
| CN | 108513659 | B | * | 12/2021 | G06F 16/24556 |
| WO | WO-2021252550 | A1 | * | 12/2021 | G06F 16/958 |

OTHER PUBLICATIONS

International Search Report and Written Opinion, International Application No. PCT/EP2022/055219, Jun. 9, 2022, 50 pgs.

* cited by examiner

300

302 304 306

| Order | Document ID | Accessible |
|---|---|---|
| 0 | Doc2 | True |
| 1 | Doc5 | False |
| 2 | Doc3 | True |
| N | DocN | *True/False |

MANAGING SEARCH QUERIES USING ENCRYPTED CACHE DATA

BACKGROUND

The present disclosure relates generally to the field of data security and, more specifically, to managing search queries of data content management systems using encrypted cache data.

Data content management systems may utilize a search platform or engine (e.g., an Enterprise Search Platform) to locate various data files and/or documents in response to a search query. The search platform may use an access control list (ACL) to determine if a user has access to the data files/documents that were found in response to the search query. The search platform may remove any data files or documents that the user does not have access to and return a result list showing only accessible data files/documents.

SUMMARY

Embodiments of the present disclosure include a method and system for managing search queries using encrypted cache data. A processor may receive a search query and encrypted cache data from a search client, wherein the encrypted cache data contains information pertaining to previous data access control determinations for the search client. The processer may search one or more indices comprising a listing of target data that matches the search query. The processor may decrypt the encrypted cache data. The processor may collate the decrypted cache data with the listing of target data to ascertain a first accessibility determination to a first data of the target data. The processor may query a data source server to ascertain a second accessibility determination to a second data of the target data that is not collated with the decrypted cache data. The processor may receive, in response to the querying, the second accessibility determination from the data source server. The processor may prepare a result list by removing a third data from the target data in response to at least one of the first accessibility determination and the second accessibility determination indicating that the third data is inaccessible by the search client.

An embodiment of the present disclosure includes a computer program product for managing search queries using encrypted cache data. The computer program product comprises a computer-readable storage medium having program instructions embodied therewith, the program instructions executable by a processor to cause the processor to perform a method. The method includes receiving a search query and encrypted cache data from a search client, wherein the encrypted cache data contains information regarding previous access control determinations for the search client. The method further includes searching a corpus of data to identify a plurality of search results for the search query. The method further includes generating, using the encrypted cache data, a search result list that includes only search results that the search client is authorized to access. The method further includes sending the search result list to the search client.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
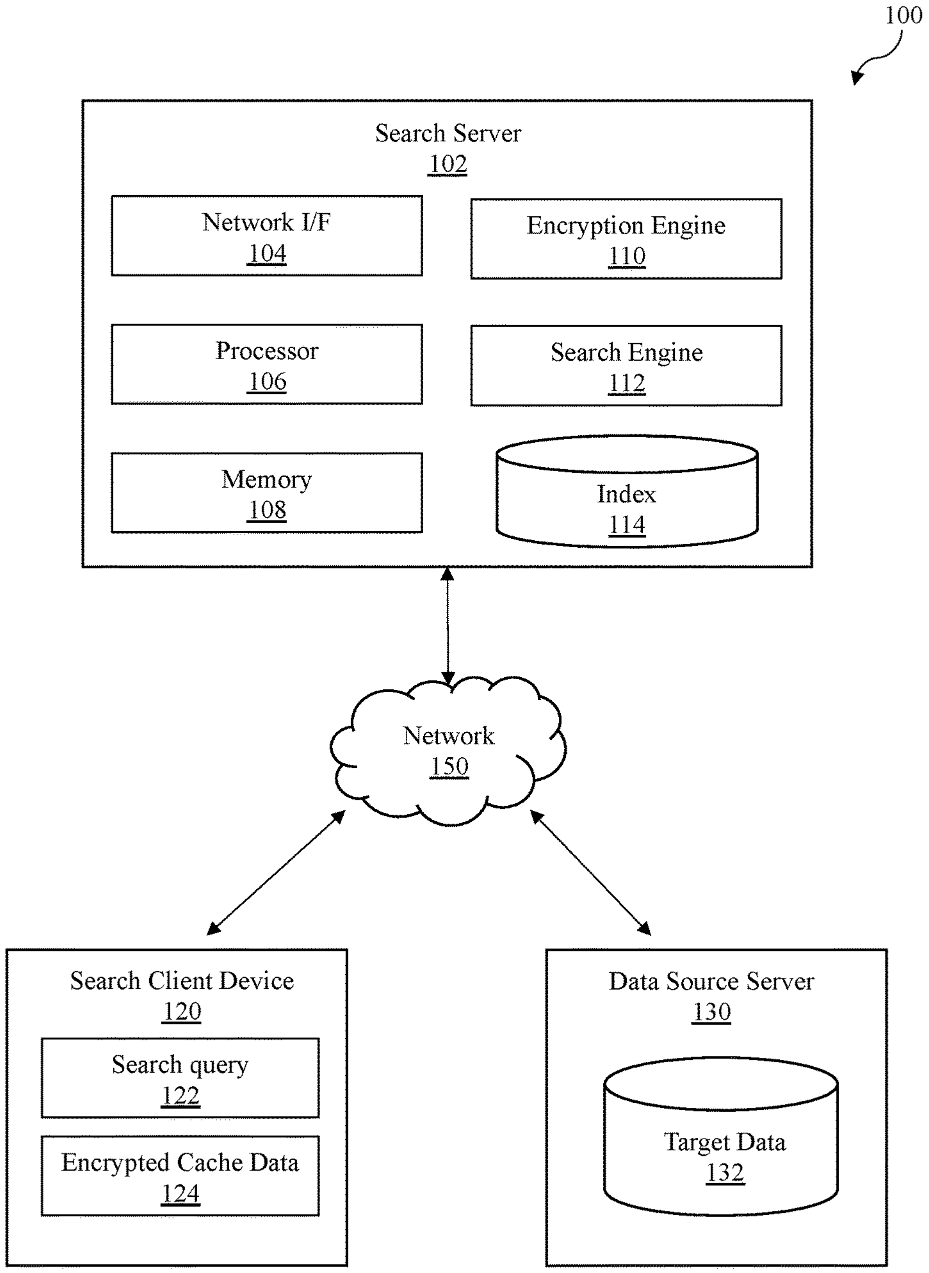
FIG. 1 illustrates a block diagram of an example data content management system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of data security and, more particularly, to managing search queries of data content management systems using encrypted cache data. While the present disclosure is not necessarily limited to such applications, various aspects of the disclosure may be appreciated through a discussion of various examples using this context.

An enterprise search is a technique that makes data content from multiple enterprise-type sources (e.g., databases, intranets, servers, etc.) searchable by a defined audience. The data content may include different formats or document types, such as XML, HTML, pdf document formats, and/or plain text. The data content may be processed and converted into plain text and then normalized to improve recall or precision using the enterprise search. The resulting text may be stored in an index or indices, which are optimized for quick lookups without storing the full text of the data content.

Enterprise Search Platforms (ESPs) have been developed to search the data content from multiple data content management systems and/or file servers simultaneously as opposed to a general web-based search. A search client may issue a search query to the ESP consisting of any necessary search terms (e.g., data description, file names, etc.) as well as navigational actions such as faceting and paging information. The search query is then compared to an index or indices, and the ESP will return a search result list referencing any target data (e.g., documents or data file) that match the query.

The search query may be a secured search and offer document-level security by requiring access verification of the search client that initiated the search by comparing the client's credentials to an access control list (ACL). If the ACL indicates that the search client has the required access to a specific document or data (e.g., target data) in response to the search query, then the given document/data may appear in the search result list. The secured search may be performed by either pre-filtering or post filtering the search result list.

Pre-filtering (or early binding) requires analyzing authorizations or permissions to the data content and assigning documents at the indexing stage. The ESP requires obtaining the ACL and recording the ACL in the index or indices when retrieving the target data. Pre-filtering offers high-speed processing time because it is possible to determine whether a search result can be displayed or not by verifying the search client in the ACL stored in the indices. However, a problem with pre-filtering may occur if there is a change made to the ACL after creation of the indices, thus resulting in an incorrect/inaccurate search result list. For example, the user may be granted or have revoked authorization to access the target data between the time period of the initial indexing and querying of the data content.

Post-filtering (or late binding) attempts to correct this problem by analyzing authorizations to data content and assigning documents at the querying stage. The ESP will use post-filtering to constantly reflect the latest ACL in the displayed results. Post-filtering will query a data source server(s), where the requested target data is stored, each time to determine whether a given document can be displayed in the search results, rather than only analyzing the indices. However, querying the data source server, which may be an external system, may be costly and increase the time taken to display or receive the search result list.

Embodiments of the present disclosure include a system, method, and computer program product that reduces the post-filtering time required to display a search result to a search client by caching prior accessibility determinations (e.g., whether a client has authorization to access secured data content) to target data from previous queries of a data source server.

In embodiments, a search server may encrypt the prior accessibility determinations along with an identification of the respective target data that was determined to be accessible/inaccessible by the search client as encrypted cache data. In embodiments, the cache data may include a cache data table (e.g., an ordered list or hash table) that lists each accessibility determination that was queried for the target data from a prior search query. Each time the data source server is queried regarding whether new target data is accessible or inaccessible to the search client in response to a new search query, an identification of the target data may be added to the cache data table including the accessibility determination. For example, the cache data table may include an accessibility determination that indicates that a first data of the target data is accessible by the search client, while a second data of the target data is inaccessible by the search client. The encrypted cache data may be sent to the search client and stored on an associated search client device.

In embodiments, each time a search client issues a new search query, the search client also sends the encrypted cache data held by the search client back to the search server. The search server may search one or more indices to determine which target data matches the new search query. Once the target data has been determined, the search server may decrypt the encrypted cache data and collate target data with any previous data that was determined to be accessible to the search client from a prior search query. In this way, the search server is not required to query the data source server to verify access to target data that has a previous accessibility determination listed in the cache data. This limits the number of queries to the data source server and reduces the time required to produce a finalized result list in response to the search query. However, any target data that has not been previously verified to be accessible may require a query to the data source server to be corroborated with the ACL.

In some embodiments, the cache data (or cache data table) may have a predetermined size threshold (e.g., maximum data size limit), such that when the total number of cache data entries reaches the predetermined size threshold, cache data entries are deleted sequentially in the order form the oldest to newest. In this way, the timing of previous inquiries to the data source server are deleted sequentially from oldest to newest to reflect the latest ACL. For example, older queries for target data that the search client may have been determined to have access to may no longer be valid (e.g., the access control list changed and/or the search client's access has been revoked). When the cache data reaches the predetermined size threshold, these older entries will be deleted, which necessitates a new query to the data source server.

In some embodiments, the predetermined size threshold of the cache data table does not need to be a fixed value and may be changed dynamically. For example, the search server may monitor how often cache data entries are replaced in the cache data table as a result of the predetermined size threshold being met. If the older cache data entries are being replaced at a high frequency rate in relation to the number of queries (e.g., after 5 queries, 10 queries, etc.), then the search server may automatically increase the predetermined size threshold of the cache data table (e.g., increasing the cache data table from 150 KB to 200 KB).

In some embodiments, the cache data may utilize a predetermined holding time limit for the cache data entries rather than using a predetermined size threshold. The predetermined holding time limit may be used to determine when a cache data entry may be deleted. For example, when the predetermined holding time limit is met, the respective cache data entry will be deleted from table.

In embodiments, the cached data may be encrypted by a search server to prevent falsification by the client and transferred to the client with the search result each time the server responds to a search query. Using the cached data that includes the accessibility determination to previous target data from a past search query, the search server is not required to query a data source server regarding access to target data that needs to be verified with the ACL.

In this way, the time spent requiring confirmation regarding accessibility to various target data is reduced, and thus the search results may be displayed in a shorter period of time over conventional post-filtering enterprise searches. Further, the latest ACL can be reflected in the search result using the encrypted cache data without reproducing an index as required using conventional pre-filtering methods. This may be beneficial, for example, when an index has a large size that would require an enormous amount of time to reindex using pre-filtering methods.

In comparison with the conventional post-filtering, the time required until an update of an ACL is reflected in the search result may be reduced, but appropriate data size settings for cache data realizes both faster search time owing to reduction of redundant query time and accurate accessibility determination. Furthermore, storing the encrypted cache data on the search client's device prevents the post-filtering result from being cached in the search server which, in turn, requires less memory and storage requirements for the search server. For example, the storage capacity required to hold caches is increased in proportion to the number of users, whereas the present disclosure does not require a memory/storage secured for cache in the server because the cache is held in each search client's device.

For example, assuming that the number of caches is 10,000, and each identification of the target data has 16 bytes and an accompanying accessibility determination having 1 byte, a cache capacity required for the search client is about 166 KB. However, if the caches are held by the search server under the same conditions, a required memory/storage capacity is increased in proportion to the number of search clients. Therefore, assuming a search server may have 10,000 search clients, a required cache capacity is about 1.6 GB. In this way, the storage capacity required by the search server is reduced by storing the cache data on the client side. In some embodiments, if the search client is using a web browser, the search method can be realized by using a Cookie without preparing for any type of special storage.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of example data content management system 100, in accordance with embodiments of the present disclosure. In the illustrated embodiment, data content management system 100 includes search server 102 that is communicatively coupled to search client device 120 and data source server 130 via network 150. Search server 102, search client device 120, and data source server 130 may be configured as any type of computer system and may be substantially similar to computer system 1101 of FIG. 5. In embodiments, data source server 130 may be configured as a secured data repository or a secured data storage system that requires an authorization to access target data 132 secured thereon. Data storage server 130 may include an access control list (ACL) that identifies one or more search clients that have access to target data 132. In embodiments, search server 102 and data source server 130 may be established on-premises (e.g., within an organization's data center) or in a cloud computing environment, where they can be accessed by search client device 120.

Network 150 may be any type of communication network, such as a wireless network or a cloud computing network. Network 150 may be substantially similar to, or the same as, cloud computing environment 50 described in FIG. 6. In some embodiments, network 150 can be implemented within a cloud computing environment (on-premises/off-premises), or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over network 150.

In some embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium. For example, search server 102 may communicate with search client device 120 and data source server 130 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments search server 102 may communicate with data source server 130 using a hardwired connection, while communication between search client device 120 and search server 102 may be through a wireless communication network.

In embodiments, search client device 120 may be any type of computing device (e.g., laptop, tablet, smartphone, and the like) that is configured to submit a search query 122 to search server 102. In embodiments, search query 122 may include encrypted cache data 124. In embodiments, encrypted cache data 124 may include a cache data table (e.g., an ordered list or ordered hash table of data entries) indicating a set of data (or target data) that has previously been determined to be accessible/inaccessible by the search client. For example, the cache data table may include an identification of previous target data that has been confirmed to be accessible by the search client by corroborating the previous target data with the ACL from a previous query. An example cache data table is further described in reference to FIG. 3. Encrypted cache data 124 may be used by search engine 112 to make accessibility determinations for access to target data 132 requested in a new search query 122 by a search client 120.

In the illustrated embodiment, search server 102 includes network interface (I/F) 104, processor 106, memory 108, encryption engine 110, search engine 112, and index 114. In embodiments, search client device 120 and data source server 130 may also contain similar components (e.g., processors, memories, network I/F, etc.) as search server 102, however, for brevity purposes these components are not shown.

In embodiments, encryption engine 110 is configured to encrypt and/or decrypt cache data associated with a search client (e.g., encrypted cache data 124 that may be sent to or received from search client device 120). Encryption engine 110 may encrypt cache data associated with a search client to prevent falsification of cache data on the client side. For example, encrypting the cache data prevents the search client from obtaining or viewing inaccessible target data. Encryption engine 110 may use an encryption key to decrypt the encrypted cache data 124. The encryption key may be stored on search server 102, such that the encryption key is inaccessible by the search client. Storing the encryption key on search server 102 prevents the encryption key from being shared by search clients, thus adding an additional layer of data security. Encryption engine 110 may decrypt the encrypted cache data 124 to allow search engine 112 to make accessibility determinations to target data 132 stored on data source server 130.

In embodiments, search engine 112 is configured to perform a search of index 114 in response to search query 122 received from search client device 120. Search engine 112 may locate and/or identify any target data 132 from index 114 that has been requested in search query 122. In embodiments, search engine 112 may be configured to make accessibility determinations to target data 132 by using the decrypted cache data. For example, the search engine 112 may make a first accessibility determination by collating the decrypted cache data (e.g., cache data table showing entries indicating the search client has been authorized to access previous target data) with a first data of the target data 132.

In embodiments, if search query 122 requests access to target data 132 that has not been identified in the decrypted cache data, then search engine 112 is configured to query data source server 130 for a second accessibility determination of the target data 132. The data source server 130 may utilize the ACL, make the second accessibility determination to a second data of the target data 132, and send the second accessibility determination back to the search server 102. Using both the first accessibility determination (that was based on the cache data) and the second accessibility determination that was received in response to the query of data source server 130, search engine 112 can prepare or generate a result list by removing any target data (e.g., third data) that was determined by the search engine not to be accessible by the search client.

In embodiments, search engine 112 may update the cache data with any new accessibility determinations to target data that was not previously included in the cache data table. For example, search engine 112 will add new entries for authorization to target data that was not previously included in the cache data table, but has been verified by the data source server 130 using the ACL for the current query. Encryption engine 110 may encrypt the updated cache data where it can be sent by search server 102 back to the search client along with the result list. In this way, search client device 120 may store the updated encrypted cache data that reflects the current ACL on the data source server 130. Further, the updated encrypted cache data 124 may be used by the search client when issuing new search queries. In this way, when search engine 112 performs a new search of index 114, it may use the updated encrypted cache data to verify that the search client has access to any given target data requested in a new search query, while preventing multiple queries to the data source server 130 for verification of the ACL.

FIG. 1 is intended to depict the representative major components of data content management system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with data content management system 100 may not be present, and the arrangement of components may vary.

For example, while FIG. 1 illustrates an example data content management system 100 having a single search server 102, a single search client device 120, and a single data source server 130 that are communicatively coupled via a single network 150, suitable network architectures for implementing embodiments of this disclosure may include any number of search servers, search client devices, data source servers, and networks. The various models, modules, systems, and components illustrated in FIG. 1 may exist, if at all, across a plurality of search servers, search client devices, data source servers, and networks.

Figures 2, 3:
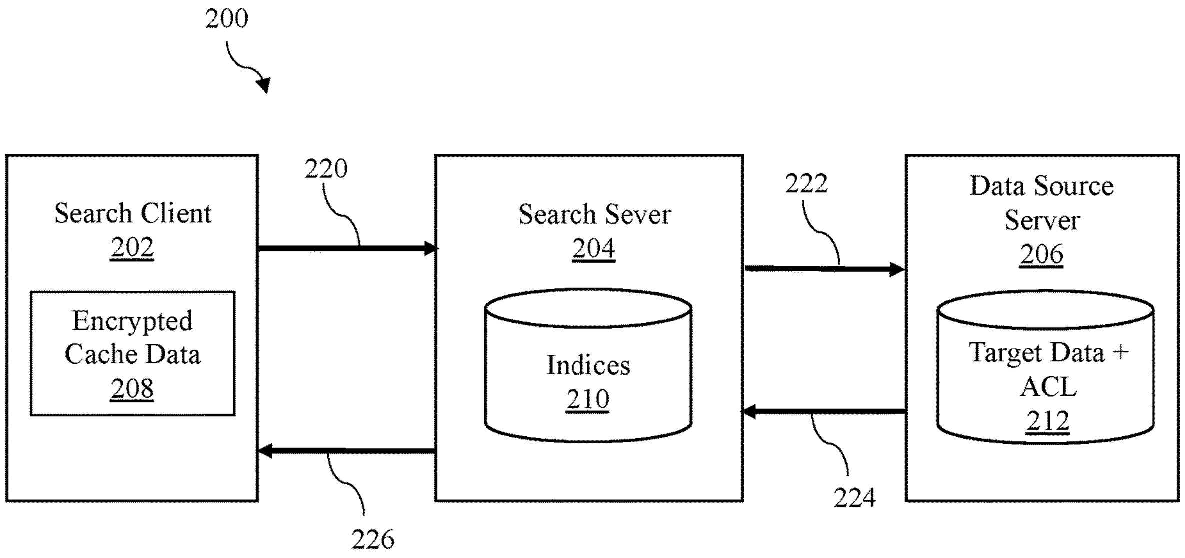
FIG. 2 illustrates an example operational diagram for performing a search query, in accordance with embodiments of the present disclosure.
FIG. 3 illustrates an example cache data table, in accordance with embodiments of the present disclosure.

Referring now to FIG. 2, shown is an example operational diagram 200 for performing a search query, in accordance with embodiments of the present disclosure. In the illustrated embodiment, search client 202 may issue a search query that includes encrypted cache data 208 that is sent to search server 204. In embodiments, encrypted cache data 208 may include a cache data table having a set of entries indicating which data (target data) the search client has been authorized to access based on one or more prior accessibility determinations from a previous search query. In embodiments, encrypted cache data 208 may have been generated and sent to search client 202 by search server 204 in response to a previous or initial search query. An example representation of a cache data table is further described in FIG. 3. In some embodiments, encrypted cache data 208 may include an authorization that indicates whether the search client 202 has access to query the search server 204.

In embodiments, search server 204 receives 220 the search query and performs a search of one or more indices 210 comprising a listing of target data (e.g., corpus of data), including the target data requested in the search query. Search server 204 locates any target data matching the search query received from search client 202 and generates a search result. Search server 204 decrypts encrypted cache data 208 and collates the decrypted cache data with the identified target data in the search result to determine which data of the target data is accessible by search client 202. For example, search server 204 will determine which target data (e.g., a first data), based on collating the decrypted cache data with the listing of target data, is accessible by search client 202 and which target data is inaccessible by search client 202. This may be performed by analyzing entries in the cache data table that indicate which data have been verified to be accessible/inaccessible by search client 202 in the past based on a prior accessibility determinations and which data has no accessibility determination and therefore is inaccessible.

In embodiments, search server 204 may query 222 data source server 206 to ascertain a second accessibility determination for any data of the target data from the search result that did not match any entries in the cache data table. For example, search server 204 will need to verify the search client's access to any target data that the search client has not been previously been determined to have access to by corroborating the data with an ACL. Data source server 206 may search target data and an ACL 212 located thereon, and make the second accessibly determination as to whether search client 202 has access to a second data of the target data by verifying access using the ACL. Data source server 206 will generate the second accessibility determination which is received 224 by search server 204 in response to the query 222.

In embodiments, search server 204 may prepare a result list by removing any inaccessible (e.g., third data) target data from the search result based on the first accessibility determination made using the cache data and the second accessibility determination received from data source server 206. Search server 204 may update and encrypt the cache data and/or cache data table to include the results of the second accessibility determination of the target data. Search server 204 may send 226 a finalized result list (e.g., showing only target data that has been determined to be accessible by the search client) and the updated encrypted cache data back to search client 202. The result list may be displayed to the client showing only accessible target data. The updated encrypted cache data may be utilized by search client 202 and search server 204 for any further search queries.

In this way, encrypted cache data 208 is stored by search client 202 and can be used by search server 204 to make any accessibility determinations for any requested target data. If all returned target data requested in the search query have a prior accessibility determination stored in an entry in the cache data, then a query to the data source server 206 will not be made. Thus, it is not required for the search server 204 for a certain period to query the data source server 206 about accessibility/inaccessibility of search target data about which the data source server was queried in the past. This allows the cost spent for the querying an external system (e.g., data source server) to be reduced and the time required until a search result is displayed becomes shorter than that of the conventional post-filtering processing.

Referring now to FIG. 3, shown in an example cache data table 300, in accordance with embodiments of the present disclosure. In the illustrated embodiment, cache data table 300 includes order column 302, document ID column 304, and accessible column 306. It is noted that more or less order values, document IDs, and accessible determinations may be included in the cache data table 300 depending on the given search query and/or access control list (ACL), and that the cache data table 300 is not meant to be limiting.

In the illustrated embodiment, order column 302 indicates an order in which the given document was determined to be accessible. For example, Doc2 is listed with a 0 order value which indicates it was determined to be accessible prior to Doc5, Doc3, and DocN, which include respective order values 1, 2, and N. As new target data (not previously included in the cache data table) is evaluated against an access control list for a given search query, the new target data (e.g., documents) may been included as entries in the cache data table 300. Each entry includes an accessibility determination which indicates whether the search client has been determined to have access to the document. For example, Doc2 has been determined to be accessible ("True") by the search client, while Doc5 has been determined to be inaccessible ("False") by the search client. Using the cache data table 300, the search server can quickly verify various documents that have been determined to be accessible to the search client without necessitating querying the data source server where the target data is stored.

In some embodiments, the cache data table 300 may have a predetermined size threshold, such that when the total number of entries reach the predetermined size threshold, cache data entries are deleted sequentially in the order from the oldest to newest. For example, as cache data table 300 grows in data size because new entries are added, older entries (e.g., the 0 order entry) may be deleted. In this way, the previous inquiries to the data source server are deleted sequentially from oldest to newest to reflect the latest ACL. For example, since the cache data table 300 lists entries in sequential order, older queries for target data that the search client may have been determined to have access to may no longer be valid (e.g., the access control list has changed and/or the search client access has been revoked). Therefore, when the cache data table 300 reaches the predetermined size threshold, these older entries will be deleted, which may necessitate a new query to the data source server for each respective document in the deleted entry if it is returned in a search result in response to a new query.

In some embodiments, the predetermined limit of the cache data table 300 does not need to be a fixed value by may be changed dynamically. For example, the search server may monitor how often cache data entries are replaced in the cache data table 300 as a result of the predetermined size threshold being met. If the older cache data entries are being replaced at a high frequency rate in relation to the number of issued search queries (e.g., after 5 queries, 10 queries, etc.), then the search server may automatically increase the predetermined size threshold of the cache data table 300.

In some embodiments, the cache data table 300 may utilize a predetermined holding time limit for the cache data entries rather than a predetermined size threshold. The predetermined holding time limit may be used to determine when a cache data entry may be deleted. For example, each entry may have a time limit of 24 hours, so once the 24-hour holding time limit is met, the respective cache data entry will be deleted from table. In these embodiments, the cache data table 300 may have another column that stores a timestamp of when the entry was created, which can then be used to determine whether an existing entry has expired and needs to be deleted/ignored.

In some embodiments, if target data of the search result is already included in cache data table 300, the entry order of the cache may be moved to the end, so it is not to deleted when a size threshold is reached. In some embodiments, the cache data table 300 may include an expiration criteria for the entire cache. For example, all entries of the cache data table 300 may deleted when the search client logs out or after a given date. In embodiments, a document may be visible to the search client that appears in the cache data table 300, however, any document that has never been authorized to be accessed by the search client is not visible, so security risk is limited.

Figure 4:
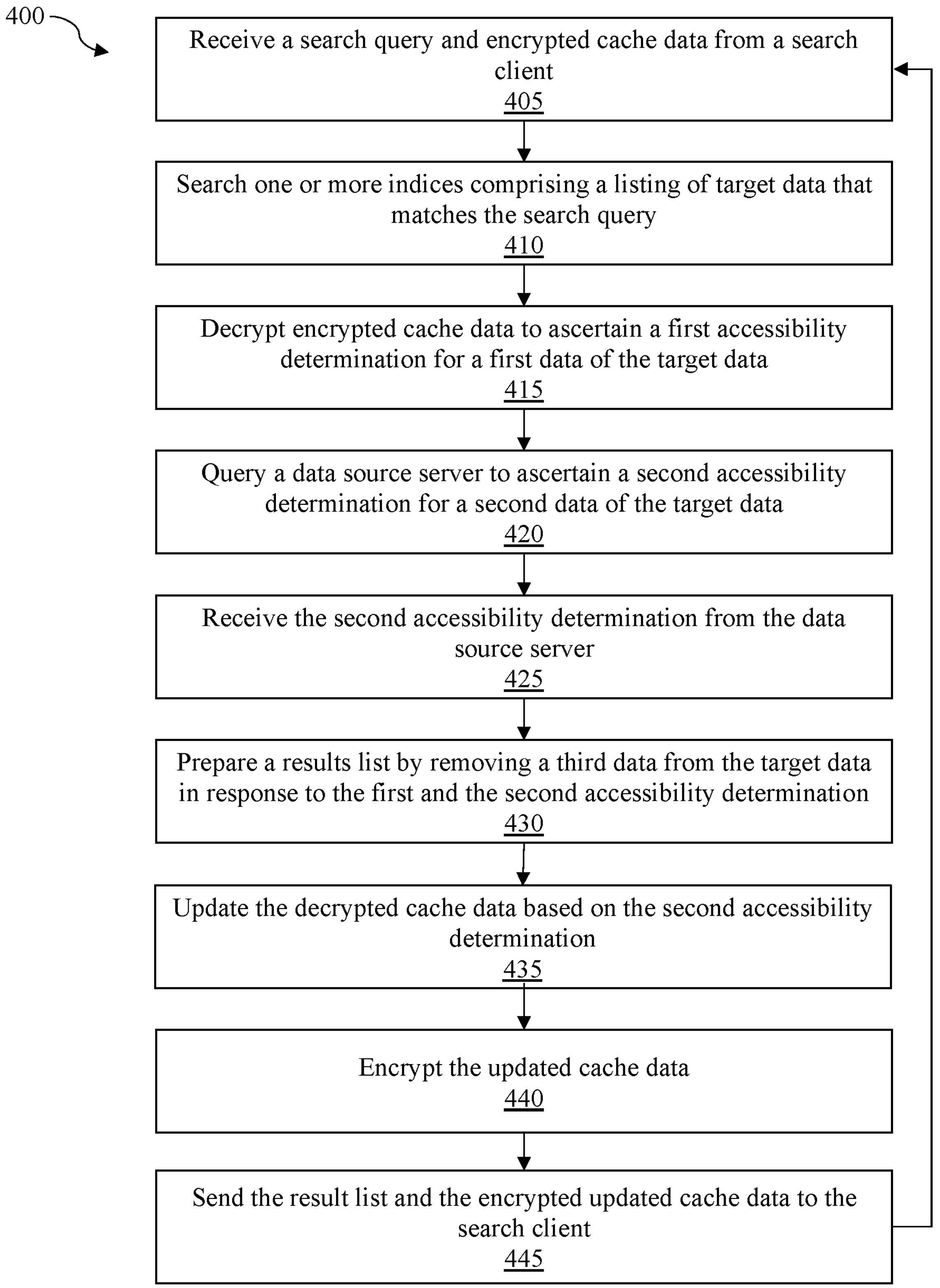
FIG. 4 illustrates a flow diagram of an example process for performing a search query, in accordance with embodiments of the present disclosure.

Referring now to FIG. 4, shown is a flow diagram of an example process 400 for performing a search query, in accordance with embodiments of the present disclosure. The process 400 may be performed by processing logic that comprises hardware (e.g., circuitry, dedicated logic, programmable logic, microcode, etc.), software (e.g., instructions run on a processor), firmware, or a combination thereof. In some embodiments, the process 400 is a computer-implemented process. In embodiments, the process 400 may be performed by processor 106 of search server 102 exemplified in FIG. 1.

The process 400 begins by receiving a search query and encrypted cache data from a search client, wherein the encrypted cache data contains information pertaining to previous data access control determinations for the search client on a server. This is illustrated at step 405. For example, the search query may include an encrypted cache data table indicating a set of data (e.g., identification of data files, documents, secured data, etc.) that the search client has been previously determined to have authorization to access using the search server. The encrypted cache data may include data that was verified as accessible by the search client by being previously corroborated with an access control list (ACL) maintained on a data source server (e.g., data source server 130 of FIG. 1). This determination may have been performed in response to a previous search query issued by the search client.

The process 400 continues by searching one or more indices comprising a listing of target data that matches the search query. This is illustrated at step 410. For example, the search server will identify any target data that matches the search query, even if the search client does not have access to the requested secured data.

The process 400 continues by decrypting the encrypted cache data, wherein the decrypted cache data is collated with the listing of target data to ascertain a first accessibility determination to a first data of the target data. This is illustrated at step 415. For example, once the search server has identified all the target data that matches the search query, the server will decrypt the encrypted cache data to identify which first data of the target data the search client has previously been verified to have access to in response to a prior search query. In some embodiments, collating may include identifying which cache data corresponds to or is related to the target data in the listing of target data. In some embodiments, the collating may include correlating which cache data corresponds to or relates to the target data found in the listing of target data.

The process 400 continues by querying a data source server to ascertain a second accessibility determination to a second data of the target data that is not collated with the decrypted cache data. This is illustrated at step 420. For example, if the resulting listing of target data matching the search query includes second data that has been identified as having no previous accessibility determination or the search client, the search server may query the data source server to determine if the search client has access to the second data based on the ACL. In some embodiments, if the first accessibility determination can be made for all the target data (e.g., each target data has been previously determined to be accessible/inaccessible in the cache data table), thus obviating the need to query the data source server, then step 420 may be skipped and the process 400 may prepare a result list including all the target data, wherein the result list is sent back to the search client.

The process 400 continues by receiving, in response to the querying, the second accessibility determination from the data source server. This is illustrated at step 425. For example, the data source server may verify from the ACL that the search client does have access to the second data of the target data, but does not have access to a third data from the target data.

The process 400 continues by preparing a result list by removing the third data from the target data in response to at least one of the first accessibility determination and the second accessibility determination indicating that the third data is inaccessible by the search client. This is illustrated at step 430. For example, any target data that the search client does not have access to will removed and not displayed in the result list.

In some embodiments, the process 400 continues by updating the decrypted cache data based on the second accessibility determination that was received from the data source server. This is illustrated at step 435. For example, the search server will continually update the cache data table to reflect the current ACL based on any received responses to inquiries from the data source server.

Once the cache data is updated, the process 400 continues by encrypting the updated cache data. This is illustrated at step 440. The process 400 continues by sending the result list and the encrypted updated cache data to the search client. This is illustrated at step 445. For example, the result list will be displayed to the search client and include any target data that was determined to be accessible to the search client, while any inaccessible target data will not be returned.

The process 400 continues by returning to step 405 where the encrypted updated cache data may be used by the search client to request a second search query. In this way, each time a search client issues a search query, the search server may utilize the encrypted cache data to quickly make accessibility determinations for target data that was requested in the search query without inquiring the data source server each time which can be inefficient.

In some embodiments, a computer program product may include program instructions that are executable by a processor to cause the processor to perform a method. The method may include receiving a search query and encrypted cache data from a search client, wherein the encrypted cache data contains information regarding previous access control determinations for the search client. The method may include searching a corpus of data to identify a plurality of search results for the search query. The method may include generating, using the encrypted cache data, a search result list that includes only search results that the search client is authorized to access. The method may include sending the search result list to the search client.

Figure 5:
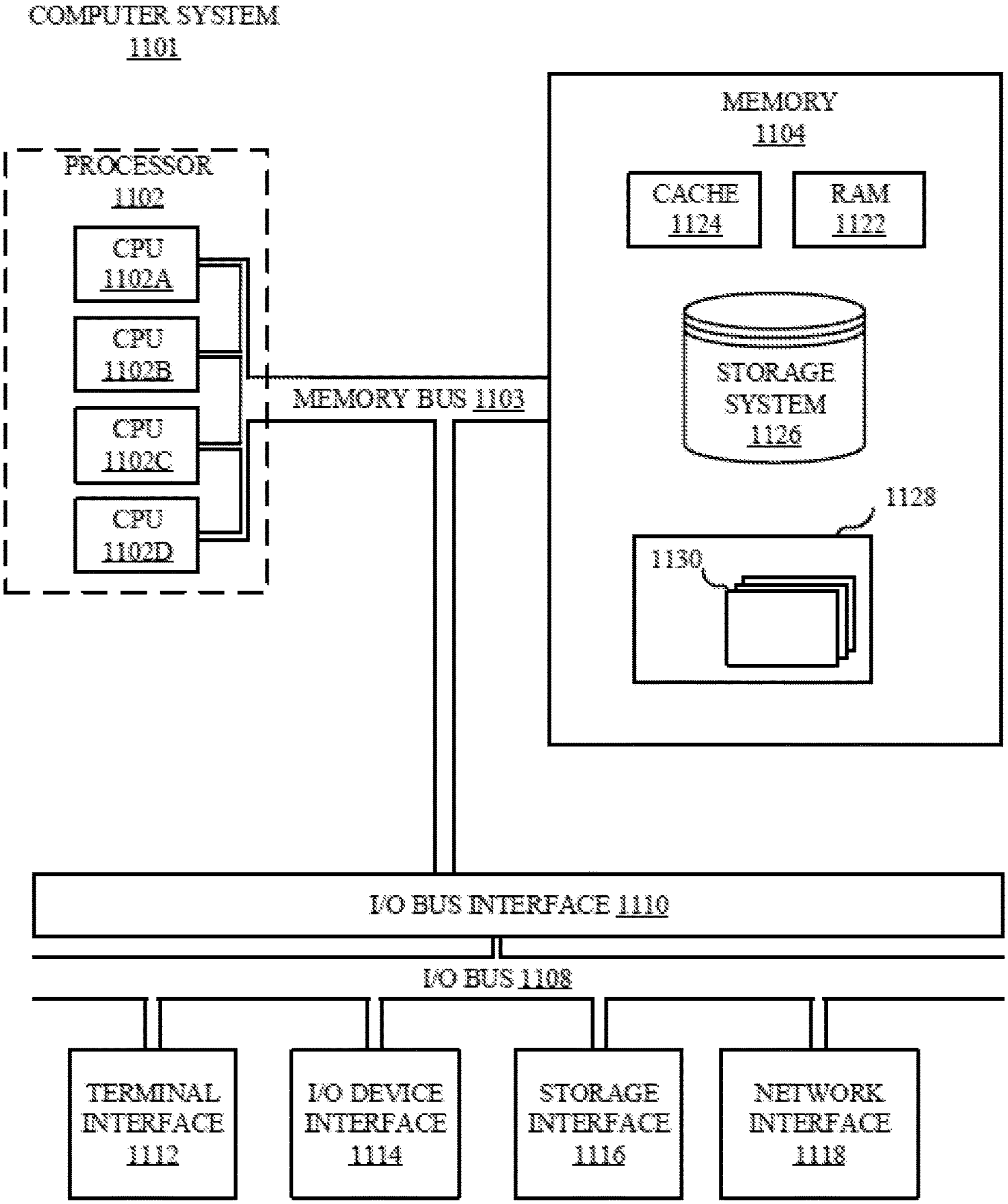
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 400 as described in FIG. 4). In some embodiments, the computer system 1101 may be configured as data content management system 100 of FIG. 1.

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 5 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 1101. In some embodiments, however, individual components may have greater or lesser complexity than as represented in FIG. 5, components other than or in addition to those shown in FIG. 5 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various search servers through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
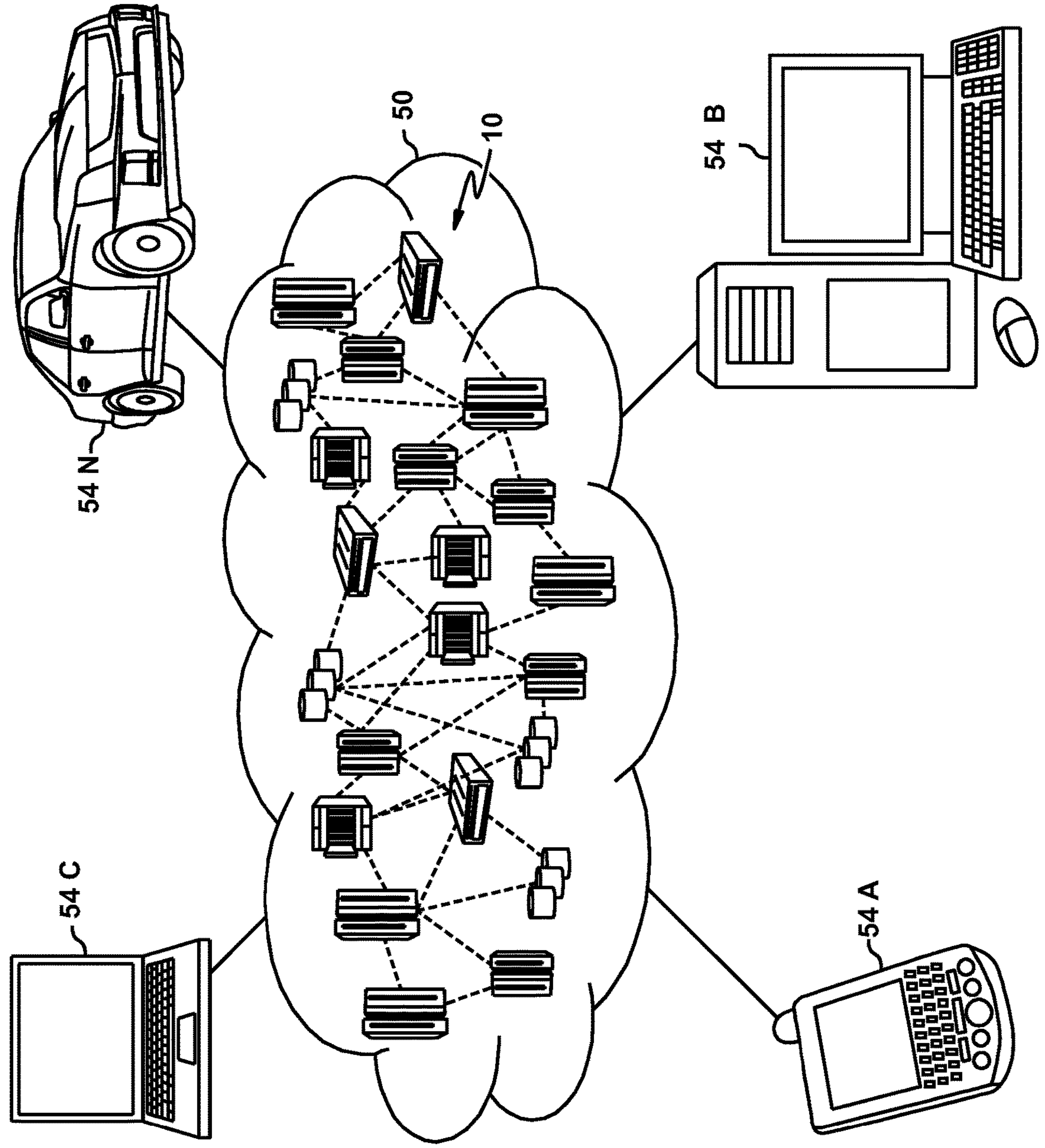
FIG. 6 depicts a cloud computing environment in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
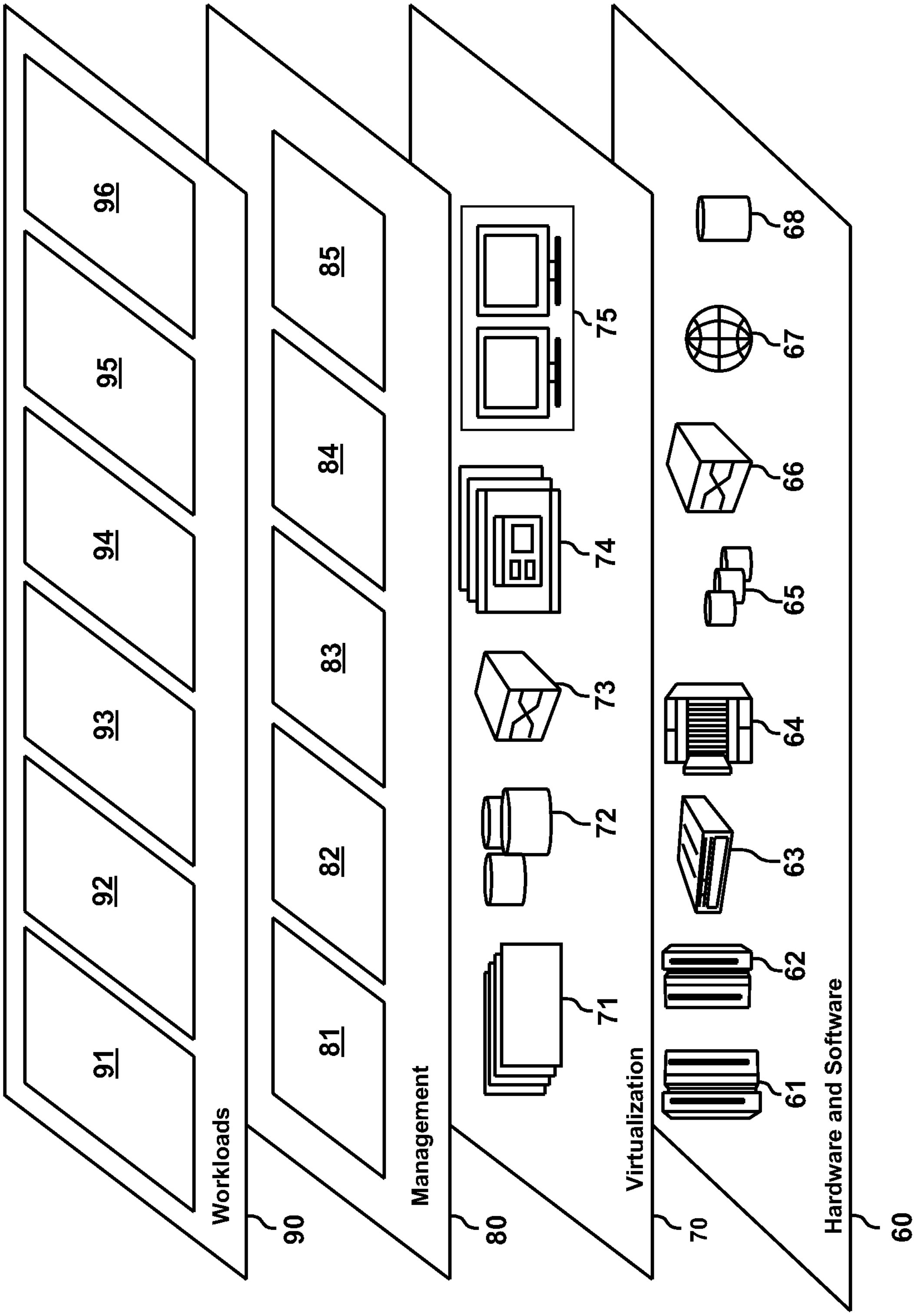
FIG. 7 depicts abstraction model layers in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and search engine software 68 in relation to the data content management system 100 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and search query processing 96. For example, data content management system 100 of FIG. 1 may be configured to perform search queries using workloads layer 90.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:

sending, by a server of an enterprise search platform, an encrypted cache data table to a search client device, wherein the encrypted cache data table comprises one or more accessibility determinations for enterprise data that was previously verified using an access control list in response to a prior search query from the search client device;

receiving, by the server, a new search query and the encrypted cache data table from the search client device;

searching, by the server, one or more indices comprising a listing of target data that matches the new search query;

decrypting, by the server using an encryption key that is inaccessible by the search client device, the encrypted cache data table, wherein the one or more accessibility determinations for the enterprise data that was previously verified using the access control list from the decrypted cache data table is collated with the listing of target data to ascertain a first accessibility determination to a first enterprise data of the target data;

querying, by the server, a data source server to ascertain a second accessibility determination to a second enterprise data of the target data that is not collated with the decrypted cache data table, wherein the second enterprise data is verified against the access control list to ascertain the second accessibility determination to the second enterprise data;

receiving, by the server and in response to the querying, the second accessibility determination from the data source server;

preparing, by the server, a result list by removing a third enterprise data from the target data in response to at least one of the first accessibility determination and the second accessibility determination indicating that the third enterprise data is inaccessible by the search client device;

updating, by the server, the decrypted cache data table to indicate that the third enterprise data of the target data is inaccessible to the search client device;

encrypting, by the server using the encryption key, the updated cache data table; and sending, by the server, the result list and the encrypted updated cache data table to the search client device, wherein the encrypted updated cache data table is stored on the search client device.

2. The computer-implemented method of claim 1, wherein the cache data table comprises an ordered list of prior accessibility determinations having a predetermined size threshold.

3. The computer-implemented method of claim 2, wherein the predetermined size threshold is a maximum size threshold, and wherein one or more of the prior accessibility determinations is deleted sequentially from the ordered list from oldest to newest when the maximum size threshold is met.

4. The computer-implemented method of claim 1, wherein the cache data table comprises an ordered list of prior accessibility determinations, and wherein one or more of the prior accessibility determinations is deleted sequentially from the ordered list based on an elapsed time value.

5. The computer-implemented method of claim 1, wherein the cache data table comprises an ordered list having a predetermined maximum size threshold, and wherein cache data entries are deleted sequentially from the ordered list from oldest to newest when the maximum size threshold is met, further comprising:

adding one or more new entries to the cache data table based on the second accessibility determinization; and monitoring a frequency of cache data entries being deleted in the cached data table as a result of the predetermined size threshold being bet.

6. The computer-implemented method of claim 5, further comprising:

comparing the frequency of cache data entries being deleted to a predetermined frequency threshold;

increasing, automatically and in response to the predetermined frequency threshold being met, the predetermined size threshold of the cache data table from a first data size to a second data size.

7. A system comprising:

a processor; and a computer-readable storage medium communicatively coupled to the processor and storing program instructions which, when executed by the processor, cause the processor to perform a method comprising:

sending, by a server of an enterprise search platform, an encrypted cache data table to a search client device, wherein the encrypted cache data table comprises one or more accessibility determinations for enterprise data that was previously verified using an access control list in response to a prior search query from the search client device;

receiving a new search query and the encrypted cache data table from the search client device;

searching one or more indices comprising a listing of target data that matches the new search query;

decrypting, using an encryption key that is inaccessible by the search client device, the encrypted cache data table, wherein the one or more accessibility determinations for the enterprise data that was previously verified using the access control list from the decrypted cache data table is collated with the target data to ascertain a first accessibility determination to a first enterprise data of the target data;

querying a data source server to ascertain a second accessibility determination to a second enterprise data of the target data that is not collated with the decrypted cache data table, wherein the second enterprise data is verified against the access control list to ascertain the second accessibility determination to the second enterprise data;

receiving, in response to the querying, the second accessibility determination from the data source server;

preparing a result list by removing a third enterprise data from the target data in response to at least one of the first accessibility determination and the second accessibility determination indicating that the third enterprise data is inaccessible by the search client device;

updating the decrypted cache data table to indicate that the third enterprise data of the target data is inaccessible to the search client device;

encrypting the updated cache data table using the encryption key; and sending the result list and the encrypted updated cache data table to the search client device, wherein the encrypted updated cache data table is stored on the search client device.

8. The system of claim 7, wherein the cache data table comprises an ordered list of prior accessibility determinations having a predetermined size threshold, and wherein one or more of the prior accessibility determinations is deleted sequentially from the ordered list from oldest to newest when a maximum size threshold is met.

9. The system of claim 7, wherein the cache data table comprises an ordered list of prior accessibility determinations, and wherein one or more of the prior accessibility determinations is deleted sequentially from the ordered list based on an elapsed time value.

10. A computer program product comprising a computer-readable storage medium having program instructions embodied therewith, the program instructions executable by a processor to cause the processor to perform a method comprising:

sending, by a server of an enterprise search platform, an encrypted cache data table to a search client device, wherein the encrypted cache data table comprises one or more accessibility determinations for enterprise data that was previously verified using an access control list in response to a prior search query from the search client device;

receiving a new search query and the encrypted cache data table from search client device;

searching one or more indices comprising a listing of target data that matches the new search query;

decrypting, using an encryption key that is inaccessible by the search client device, the encrypted cache data table, wherein the one or more accessibility determinations for the enterprise data that was previously verified using the access control list from the decrypted cache data table is collated with the listing of target data to ascertain a first accessibility determination to a first enterprise data of the target data;

querying a data source server to ascertain a second accessibility determination to a second enterprise data of the target data that is not collated with the decrypted cache data table, wherein the second enterprise data is verified against the access control list to ascertain the second accessibility determination to the second enterprise data;

receiving, in response to the querying, the second accessibility determination from the data source server; and preparing a result list by removing a third enterprise data from the target data in response to at least one of the first accessibility determination and the second accessibility determination indicating that the third enterprise data is inaccessible by the search client device;

updating the decrypted cache data table to indicate that the third enterprise data of the target data is inaccessible to the search client device;

encrypting the updated cache data table using the encryption key; and sending the result list and the encrypted updated cache data table to the search client device, wherein the encrypted updated cache data table is stored on the search client device.

11. The computer program product of claim 10, wherein the cache data table comprises an ordered list of prior accessibility determinations having a predetermined size threshold.

12. The computer program product of claim 11, wherein the predetermined size threshold is a maximum size threshold, and wherein one or more of the prior accessibility determinations is deleted sequentially from the ordered list from oldest to newest when the maximum size threshold is met.

* * * * *